Jan. 13, 1959

P. G. SMEE 2,868,972

WAVE AMPLIFYING AND GENERATING CIRCUIT

Filed Jan. 5, 1955

INVENTOR:
PETER G. SMEE,

BY Julius J. Zaskalicky
HIS ATTORNEY.

2,868,972
Patented Jan. 13, 1959

2,868,972

WAVE AMPLIFYING AND GENERATING CIRCUIT

Peter G. Smee, North Syracuse, N. Y., assignor to General Electric Company, a corporation of New York Application January 5, 1955, Serial No. 479,913

2 Claims. (Cl. 250—27)

The present invention relates in general to wave generating circuits and in particular, to an improved circuit for deriving a sawtooth wave from a pulse type wave.

Generally, sawtooth waves are derived by periodically charging and discharging a capacitance. The capacitance is usually charged through a resistance and periodically discharged through a pulse amplifier. When a pulse amplifier is so used, the discharging of the capacitance adversely affects the output of the amplifier to the extent of distorting the shape of the pulse. The present invention is directed principally to the elimination of such short-comings in pulse amplifiers.

Accordingly, an object of the present invention is to provide a simple and effective combination pulse amplifier and sawtooth generator in which interaction between the sawtooth generating portion and the pulse amplifier portion is substantially eliminated.

Another object of the present invention is to provide a sawtooth wave generator whose characteristics are independent of tube and tube circuit characteristics.

A further object of the present invention is to provide a sawtooth output in which the starting potential is fixed entirely by resistances.

A still further object of the present invention is to provide improvements in pulse amplifiers.

The novel features which I consider to be characteristic of my invention are set forth with particularity in the appended claims. The invention itself, however, both as to its organization and method of operation together with further objects and advantages thereof may best be understood by reference to the following description taken in connection with the accompanying drawings in which:

Figure 1:
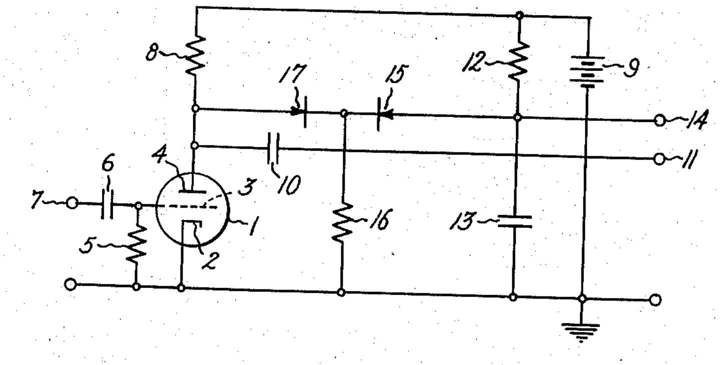
Fig. 1 is a schematic diagram of an embodiment of the present invention.

Referring now to Fig. 1 of the drawings, the circuit there represented functions in response to an input pulse to develop an independent pulse and an independent sawtooth wave. Conventionally, to effect the desired isolation in such circuits, a separate pulse amplifier would normally be used for generation of sawtooth wave for the reason that the charge and discharge of the capacitance in the sawtooth wave generating circuit through the pulse amplifier would adversely affect the rise and fall of time of the edges of the pulse from the pulse amplifier. The embodiment of Fig. 1 comprises electron discharge device 1 including a cathode 2, a grid 3, and an anode 4. The cathode is connected to ground. The grid 3 is connected through grid leak resistance 5 to ground and also through coupling capacitor 6 to input terminal 7. The anode 4 is connected through anode load resistance 8 to the positive terminal of source 9, the negative terminal of which is connected to ground. The anode is also connected through coupling capacitor 10 to output terminal 11. The portion of the circuit just described in the absence of the other elements would function as a pulse amplifier and any pulse such as the pulse of graph 18 of Fig. 2 applied between the input terminal 7 and ground would be amplified and appear as a pulse, such as shown in graph 20 of Fig. 2, at the output terminal 11.

Referring now to the sawtooth wave generating portion of this circuit, there is shown a resistance 12 and a capacitance 13 connected in series in the order named between the positive terminal of source 9 and ground. The junction of resistance 12 and capacitance 13 is connected to output terminal 14 and is also connected to the anode of unilaterally conducting device 15, the cathode of which is connected through resistance 16 to ground. The cathode of unilaterally conducting device 15 is also connected to the cathode of unilaterally conducting device 17, the anode of which is connected to the anode 4 of device 1.

Figure 2:
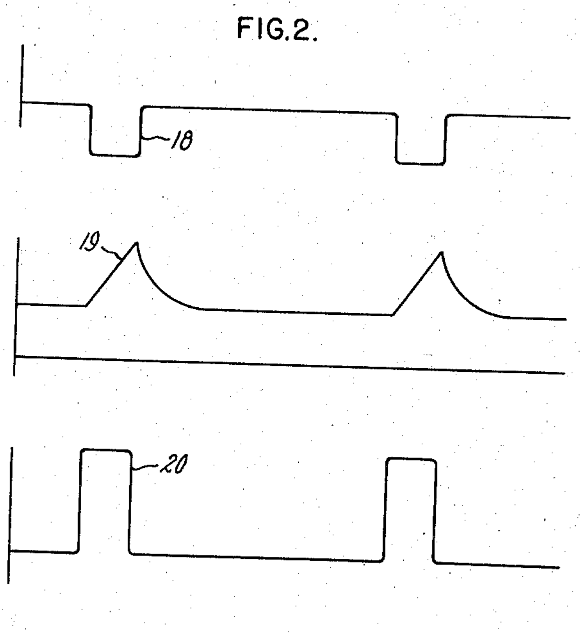
Fig. 2 represents various waveforms plotted to a common time scale useful in explaining the operation of the circuit of Fig. 1.

Referring now to the operation of the circuit of Fig. 1, in the absence of a pulse applied to the amplifier 1, current from the source 9 is caused to flow through resistance 12, unilaterally conducting device 15, and resistance 16, thereby establishing at the output terminal 14 a potential determined by the resistances 12 and 16, and by the conducting resistance of unilaterally conducting device 15 which is quite small in comparison to resistances 12 and 16. Capacitance 13, of course, is charged with respect to ground to the potential of the output terminal 14. The potential at the anode 4 is arranged such that the anode of device 17 is lower in potential than its cathode and thus, device 17 is nonconductive. Upon the application of a pulse 18 as shown in Fig. 2 to the grid of device 1, the latter is rendered nonconductive thereby causing a rise in potential of the anode 4. The potential to which the anode 4 rises is arranged to be greater than the potential at the cathode of device 17, thus, unilaterally conducting device 17 becomes conductive and raises the potential at the cathode of unilaterally conducting device 15 to render this device nonconductive. With device 15 nonconductive, the capacitor 13 begins to charge through resistance 12 thereby causing a rise in the potential at output terminal 14, as shown in graph 19 of Fig. 2, which continues as long as device 15 is nonconductive. Upon disappearance of the pulse applied to the grid of device 1, the potential at the anode 4 is caused to drop in potential thereby rendering unilaterally conducting device 17 nonconductive and unilaterally conducting device 15 again conductive to discharge the capacitance 13 through the resistance 16. Preferably, the potential at the anode 4 when the device 1 is conductive should be lower than the potential at the point 14 during this time and also the potential at the anode 4 when device 1 is nonconductive should be greater than the potential to which it is desired the point 14 to rise.

Thus, the circuit of Fig. 1 provides a sawtooth wave which begins from a predetermined reference potential precisely fixed by resistances 12 and 16. The characteristics of the sawtooth wave are independent of the characteristics of the discharge device 1 and the circuit associated with discharge device 1 since the diode 17 disconnects the device 1 from the sawtooth wave generation circuit during the discharge interval of the capacitance and the unilaterally conducting device 15 disconnects the sawtooth wave generation circuit from the device 1 during the charging interval thus eliminating any interaction of the sawtooth generating portion of the circuit on the pulse amplifier portion of the circuit.

It should be further noted that the sawtooth wave starts sharply at the instant the diode 15 is rendered nonconductive. Thus, the initial rise time is independent of the rise time of the signal applied to the grid of device 1 and the rise time at the anode of device 1. The only necessary requirement is that the rise time at the anode of device 1 be slightly greater than the rise time of the sawtooth wave to be generated.

The circuit of this invention has particular application in pulse multiplex communication systems of the kind disclosed in patent application, Serial Number 479,911, filed January 5, 1955, assigned to the assignee of the present invention, where pulses are utilized for channel selection purposes and where pulses are also utilized for the generation of sawtooth waves utilized in the generation and detection of other pulses. The provision of a circuit making use of unilaterally conducting devices in which the need for electron discharge devices for isolation purposes is eliminated, simplifies the circuit as well as reduces its cost.

While a particular embodiment of my invention has been shown and described, it is apparent that changes and modifications may be made without departing from the invention in its broader aspects and, therefore, the aim in the appended claims is to cover all such changes and modifications which fall within the true spirit and scope of my invention.

What I claim as new and desire to secure by Letters Patent of the United States is:

1. In combination, a source of unidirectional potential, a resistance and a capacitance connected in series across said source, another resistance and a unilaterally conducting device connected in series in the order recited from the end of said capacitance remote from said one resistance to the other end of said capacitance, said unilaterally conducting device being poled conductive whereby the potential at said other end of said capacitance has a value dependent on the magnitude of said resistances, means for periodically biasing said unilaterally conducting device nonconductive, said means including another unilaterally conducting device having one electrode connected to the junction of said other resistance and said one unilaterally conducting device and being poled to permit current flow to said other resistance in the same direction as said one unilaterally conducting device, means for periodically varying the potential of the other electrode of said other unilaterally conducting device from a potential which renders said other device nonconductive to another potential which renders said other device conductive and said one device nonconductive.

2. In combination, in a pulse amplifier having a pair of input terminals to which a pulse is applied and a pair of output terminals from which a pulse is obtained, a resistance and a capacitance connected in series, means for applying a undirectional potential between the remote ends of said resistance and said capacitance, another resistance and a unilaterally conducting device connected in series in the order named from said remote end of said capacitance to the other end of said capacitance, said unilaterally conducting device being poled conductive whereby the potential at said other end of said capacitance has a value dependent on the magnitude of said resistances, another unilaterally conducting device having one electrode connected to the junction of said other resistance and said one unilaterally conducting device and being poled to permit current flow to said other resistance in the same direction as permitted by said one device, means for connecting the output terminals of said pulse amplifier between said other electrode of said other device and said remote end of said capacitance and means for periodically varying the potential of said other electrode of said other device from a potential which renders said one device conductive and said other device nonconductive to another potential which renders said one device nonconductive and said other device conductive.

References Cited in the file of this patent

UNITED STATES PATENTS 2,350,069 Schrader et al. ---------- May 30, 1944

OTHER REFERENCES

Waveforms, Radiation Laboratory Series, vol. 19, 1949, by Chance et al., page 330, McGraw-Hill Co., New York, N. Y.